July 9, 1940.  L. SMITH  2,207,181

FORMING TOOL

Filed Aug. 31, 1938

Lindsley Smith
INVENTOR
BY Lindsley Smith
ATTORNEY

Patented July 9, 1940

2,207,181

UNITED STATES PATENT OFFICE 2,207,181

FORMING TOOL

Lindsley Smith, Southport, Conn.

Application August 31, 1938, Serial No. 227,737

1 Claim. (Cl. 153—32)

This invention relates to material forming tools and more particularly to tools adapted for forming uniform curves and bends in suitable metal bands or strips.

An object of the present invention resides in the provision of a simplified metal forming tool comprising adjustable guide members adapted to be adjusted for the reception of various sizes of metal stock to be shaped and including the additional provision whereby the adjustment is effected along the same axis at all times.

Another object of the present invention resides in the provision of a forming tool comprising a base member having a plurality of parallel arranged serrations formed thereon including a stationary guide member fixed thereto, and an adjustable guide member provided with complementary serrations for engaging the serrated base positively in any selected position. Further provision is made whereby the adjustable guide member is selectively positioned at all times along the axis of the stationary guide member thus providing a simple and extremely accurate method of adjusting the movable guide member with respect to the stationary member.

The forming tool to be described, as mentioned herein above, is suitable for the reception of various sizes and forms of suitable materials such as different metal bands, rods or strips, which are placed between the stationary and movable guide members. Upon insertion thereof the movable guide member is positioned in close proximity to the metal stock and clamped in this desired position by the locking means. Various shapes and designs of the metal stock may then be obtained by operating on the metal stock in conjunction with the guide members. Scrolls and curvatures of any degree are obtained by forming the stock around either guide member at different positions along the metal stock.

Further objects of the instant invention reside in any novel feature of construction or operation or novel combination of parts present in the embodiment of the invention described and shown in the accompanying drawing. Other embodiments of the invention employing the same or equivalent principle may be used and structural changes made as desired by those skilled in the art without departing from the present invention and within the spirit of the appended claim.

Figure 1:
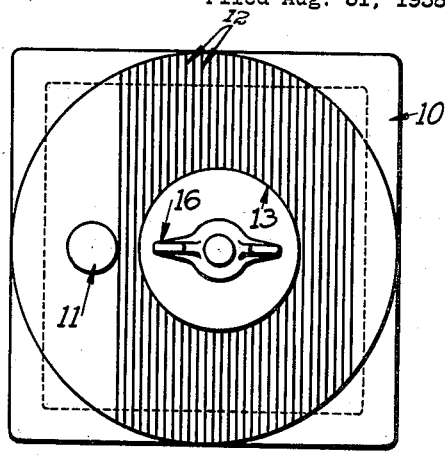
Fig. 1 is a plan view of the assembled tool.
Figures 2, 4:
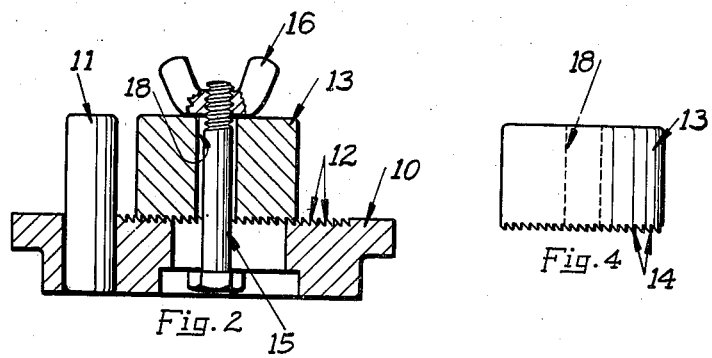
Fig. 2 is a cross sectional view of the assembled tool shown in Fig. 1.
Fig. 4 is a detail view of the movable guide member.

Referring now to the figures, the forming tool is shown to comprise a suitable base member 10 having a stationary guide member 11 secured thereto and projecting above the surface of the base, which surface is provided with a series of parallel arranged grooves or serrations 12 in the form of saw-like teeth. The serrations can be formed at any suitable distances depending upon the accuracy of adjustment of the guide members desired. A cylindrical shaped member 13 provided with complementary serrations 14 on one face thereof is adapted to engage the base member 10 and by means of the said serrations lock or positively position the member 13 with respect to the stationary member 11. Depending upon the pitch of or the distance separating the serrations any desired adjustment or relative positioning of the guide members can be effected.

Figure 3:
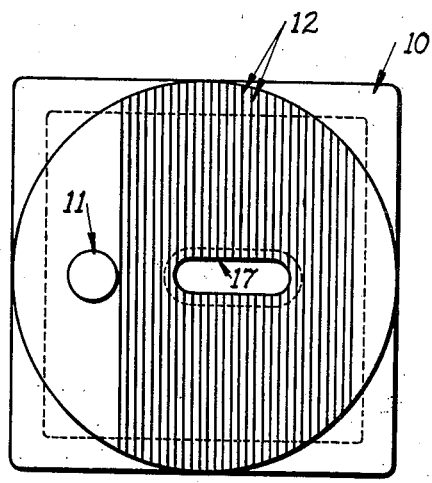
Fig. 3 is a plan view of the base member of the tool.

Locking or clamping means are provided to secure the movable guide member 13 to the base member 10 and are shown to comprise the bolt 15 and thumb nut 16. The bolt is shown to extend through a slot 17 formed in the base member 10 which extends longitudinally along the center line or axis of the stationary guide member 11 as viewed in Fig. 3. Due to this provision, the locking means comprising the bolt 15, which extends through the slot 17 and the opening 18 in the member 13, and nut 16, when not set or screwed tightly for clamping the said movable member to the base member, and the movable member 13 are adapted to be selectively positioned along the axis described and thus be set variable distances from the stationary guide member thereby permitting the insertion of the differently sized metal stocks within the forming members.

Accurate adjustment of the movable member 13 may then be effected by positioning the member in close proximity to the metal stock inserted between the forming members. This adjustment once made can then be maintained by tightening the locking means to secure firmly the member 13 to the base member 10.

What is claimed is as follows:

A device of the character described comprising a base member having a plurality of parallel serrations formed on one surface thereof and a vertical stationary cylindrical guide member secured thereto, said base member having a straight line opening formed therein and extending radially with respect to the axis of the said stationary guide member and at right angles with respect to the serrations formed on the base member, a movable cylindrical guide member having complementary serrations formed on one surface thereof, which serrations are adapted to engage the serrations formed on the base member, and means extending through the opening in the base member and said movable guide member including means for clamping the movable member to the base member, said movable member and clamping means adapted to be variably positioned along the said axis in a straight line with respect to the said stationary member when the clamping means is loosely set and upon setting of the clamping means is effective for securing the movable member to the base member in the selected position.

LINDSLEY SMITH.